United States Patent
Chicks et al.

(10) Patent No.: US 7,921,059 B2
(45) Date of Patent: Apr. 5, 2011

(54) LICENSING UPSELL

(75) Inventors: R. David Chicks, Redmond, WA (US); Aidan T. Hughes, Bellevue, WA (US); Michael P. Jorden, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 993 days.

(21) Appl. No.: 11/303,201

(22) Filed: Dec. 15, 2005

(65) Prior Publication Data

US 2007/0143222 A1 Jun. 21, 2007

(51) Int. Cl.
*G06F 21/00* (2006.01)

(52) U.S. Cl. ............... 705/59; 705/51; 705/71; 717/168; 726/27

(58) Field of Classification Search ............... 705/51, 705/59, 71, 902, 908; 726/27; 717/168
See application file for complete search history.

(56) References Cited

U.S. PATENT DOCUMENTS

| | | | |
|---|---|---|---|
| 5,237,688 A | 8/1993 | Calvert et al. ................ 717/121 |
| 5,291,598 A | 3/1994 | Grundy ........................... 726/28 |
| 5,379,343 A | 1/1995 | Grube et al. ................... 455/410 |
| 5,504,801 A | 4/1996 | Moser et al. ................ 379/29.01 |
| 5,629,980 A * | 5/1997 | Stefik et al. .................... 705/54 |
| 5,671,412 A * | 9/1997 | Christiano ................... 707/104.1 |
| 5,790,664 A * | 8/1998 | Coley et al. ................... 709/203 |
| 5,982,892 A | 11/1999 | Hicks et al. ...................... 705/51 |
| 6,169,976 B1 * | 1/2001 | Colosso ........................... 705/59 |
| 6,243,468 B1 | 6/2001 | Pearce et al. ................... 380/255 |
| 6,557,105 B1 | 4/2003 | Tardo et al. ................... 713/193 |
| 6,697,948 B1 * | 2/2004 | Rabin et al. ..................... 726/30 |
| 6,718,534 B1 | 4/2004 | Carter et al. .................. 717/100 |
| 6,754,823 B1 | 6/2004 | Kurzweil et al. ............. 713/179 |
| 6,810,389 B1 | 10/2004 | Meyer .............................. 705/59 |
| 6,920,567 B1 * | 7/2005 | Doherty et al. .................. 726/22 |
| 6,948,168 B1 | 9/2005 | Kuprionas ...................... 717/178 |
| 6,993,664 B2 | 1/2006 | Padole et al. ................... 705/59 |
| 2001/0034712 A1 | 10/2001 | Colvin ............................. 705/52 |
| 2002/0017977 A1 * | 2/2002 | Wall .............................. 340/5.28 |
| 2002/0069173 A1 | 6/2002 | Hori ................................. 705/51 |
| 2002/0174356 A1 | 11/2002 | Padole et al. ................. 713/200 |
| 2003/0037242 A1 | 2/2003 | Yasuna et al. ................. 713/179 |
| 2003/0037325 A1 | 2/2003 | Hargrove et al. ............. 717/175 |

(Continued)

FOREIGN PATENT DOCUMENTS

DE 10134356 1/2003

(Continued)

OTHER PUBLICATIONS

Office Action mailed Aug. 4, 2008, in U.S. Appl. No. 11/303,200.

(Continued)

*Primary Examiner* — Calvin L Hewitt, II
*Assistant Examiner* — Steven Kim
(74) *Attorney, Agent, or Firm* — Merchant & Gould, P.C.

(57) ABSTRACT

A licensing system provides for various versions of an application within a software product. A license type is identified from a product key that is associated with the software product. The license type may correspond to a hybrid license. When the license type is a hybrid license, an application state is determined for any applications included in the software product. A use experience for the applications is provided according to the application state when the application state is determined. For applications that are provided as upgradeable versions, an upgrade may be obtained by simply obtaining a new product key that is associated with the upgraded versions of the applications.

20 Claims, 8 Drawing Sheets

U.S. PATENT DOCUMENTS

| | | | | |
|---|---|---|---|---|
| 2003/0160823 | A1* | 8/2003 | Stannard | 345/764 |
| 2003/0233330 | A1* | 12/2003 | Raley et al. | 705/55 |
| 2004/0010469 | A1* | 1/2004 | Lenard et al. | 705/51 |
| 2004/0030903 | A1 | 2/2004 | Hicks et al. | 713/176 |
| 2004/0039705 | A1 | 2/2004 | Svancarek et al. | 705/51 |
| 2004/0039916 | A1* | 2/2004 | Aldis et al. | 713/177 |
| 2004/0044631 | A1 | 3/2004 | Walker et al. | 705/59 |
| 2004/0215969 | A1 | 10/2004 | Nance et al. | 713/191 |
| 2005/0021967 | A1 | 1/2005 | Bruekers et al. | 713/176 |
| 2005/0027554 | A1 | 2/2005 | Chahrouri et al. | 705/59 |
| 2005/0044546 | A1 | 2/2005 | Niebling et al. | 717/177 |
| 2005/0049973 | A1 | 3/2005 | Read et al. | 705/59 |
| 2005/0066324 | A1 | 3/2005 | Delgado et al. | 717/170 |
| 2005/0091168 | A1 | 4/2005 | Gunyakti et al. | 705/59 |
| 2005/0108175 | A1 | 5/2005 | Clark | 705/59 |
| 2005/0216420 | A1 | 9/2005 | Padole et al. | 705/59 |
| 2007/0143228 | A1* | 6/2007 | Jorden et al. | 705/71 |

FOREIGN PATENT DOCUMENTS

| | | |
|---|---|---|
| EP | 1 553 676 | 5/2005 |
| EP | 1 544 705 | 6/2005 |
| JP | 2003-228434 | 8/2003 |
| JP | 2004-86404 | 3/2004 |

OTHER PUBLICATIONS

Office Action mailed Jan. 26, 2009, in U.S. Appl. No. 11/303,200.
Office Action mailed Jul. 21, 2009, in U.S. Appl. No. 11/303,200.
Office Action mailed Feb. 16, 2010, in U.S. Appl. No. 11/303,200.

Aladdin.com; "*Secure Software Distribution & Licensing Version 6.4*"; accessed on Oct. 10, 2005 at http://www.aladdin.com/HASPSL/Version-6_4.asp.

Aladdin.com; "*Software Protection Using Product Activation Technology with HASP SL*"; accessed on Oct. 10, 2005 at http://www.aladdin.com/HASPSL/product_activation_asp.

Concept Software, Inc.; "*softwareKEY*"; 2004.

Dell; "*Installing the Small Business Server 2003 SP1, Premium Edition Software Applications*"; Jun. 2005; www.dell.com | support.dell.com.

Derfler; "*How Networks Work*"; Bestseller Edition, 1996, Ziff-Davis Press, Emeryville, CA, all pages.

Gralla; "*How the Internet Works*"; Millennium Edition, 1999, Que Corporation, Indianapolis, IN, all pages.

Hp.com; "*ProCurve Networking Access Control Security Solution Technical Brief*"; accessed on Oct. 10, 2005 at hptt://www.hp.com/rnd/pdf_html/access_control_security_brief.htm.

Muller; "*Desktop Encyclopedia of the Internet*"; 1999; Artech House, Inc.; Norwood, MA, all pages.

SafeNet, Inc.; "*Best Practices for Selecting and Implementing Software License Management*"; © 2005; Belcamp, MD, USA.

SafeNet, Inc.; "*SENTINEL LM Overview*"; © 2004; SafeNet, Inc.; accessed Oct. 10, 2005 at http://www.rainbow.com/products/sentinel/sentinellm.asp.

White; "*How Computers Work*"; Millennium Edition, 1999, Que Corporation, Indianapolis, IN, all pages.

\* cited by examiner

LICENSING UPSELL

BACKGROUND

Product activation is a license validation procedure required by some computer software programs. Product activation is used to invalidate or severely restrict a product's functionality until the product is registered with a publisher by means of a special identification (activation) code or "product key". Product activation often refers to a method where a software application or suite hashes hardware serial numbers and an ID number specific to the product's license (e.g., the product key) to generate a unique installation ID. The installation ID is sent to the manufacturer to verify the authenticity of the product key and determine that the product key is not being used for multiple installations. Other product key models are also used to enforce the purchase of a license for use of the software product.

Products may also have various activation states. An "unactivated" product usually acts as a time-limited trial until a product key is purchased. An "activated" product has its product key purchased and entered. Some products allow licenses to be transferred from one machine to another without deactivating the copy on the old machine before reactivating the software product on the new machine.

Most licensing systems provide a different license depending on the type of product being sold. For example, the license that accompanies a trial product is usually more limited in its scope than the license of a full or "perpetual" product. Beyond the license terms however, many current licensing systems enforce the license by not providing the full version of the product to the user. What is included on the CD or download of the software product is a trial version of the product. To obtain the full version of the product, a license for the full version would need to be purchased, and then the full version is supplied or downloaded to the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the subject matter disclosed herein are related to enabling a software product to be installed on a user's machine as a trial product, a perpetual product, an enterprise/bypass product, or a hybrid product, where applications in the software product have a combination of license types. An example of a hybrid software product is a product that includes a first application that is a trial version, and a second application that is a perpetual version.

The licensing type is dependent on the product key that accompanies the software product. A user may acquire a different product key to change the trial mode applications to fully functional applications without having to reinstall the applications. For example, a computer manufacturer could install a software suite on a computing device where the purchaser requested a basic version of the software suite (e.g., the basic version includes perpetual versions of three applications, in comparison to perpetual versions of six applications in the full version). In accordance with the subject matter described herein, the computer manufacturer can provision the machine with a product key which enables the three applications of the basic version fully while restricting the other applications to trial mode. The user could subsequently obtain a new product key to unlock the full functionality of the remaining applications on a perpetual basis. The computer manufacturer is therefore allowed to install only one instance of the software product (efficient for the manufacturer), but provide to the user different use experiences based on the product key provided. Having trial versions of the other applications of the suite installed also provides a marketing opportunity not previously present when trial versions were installed separately from any perpetual versions of an application.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
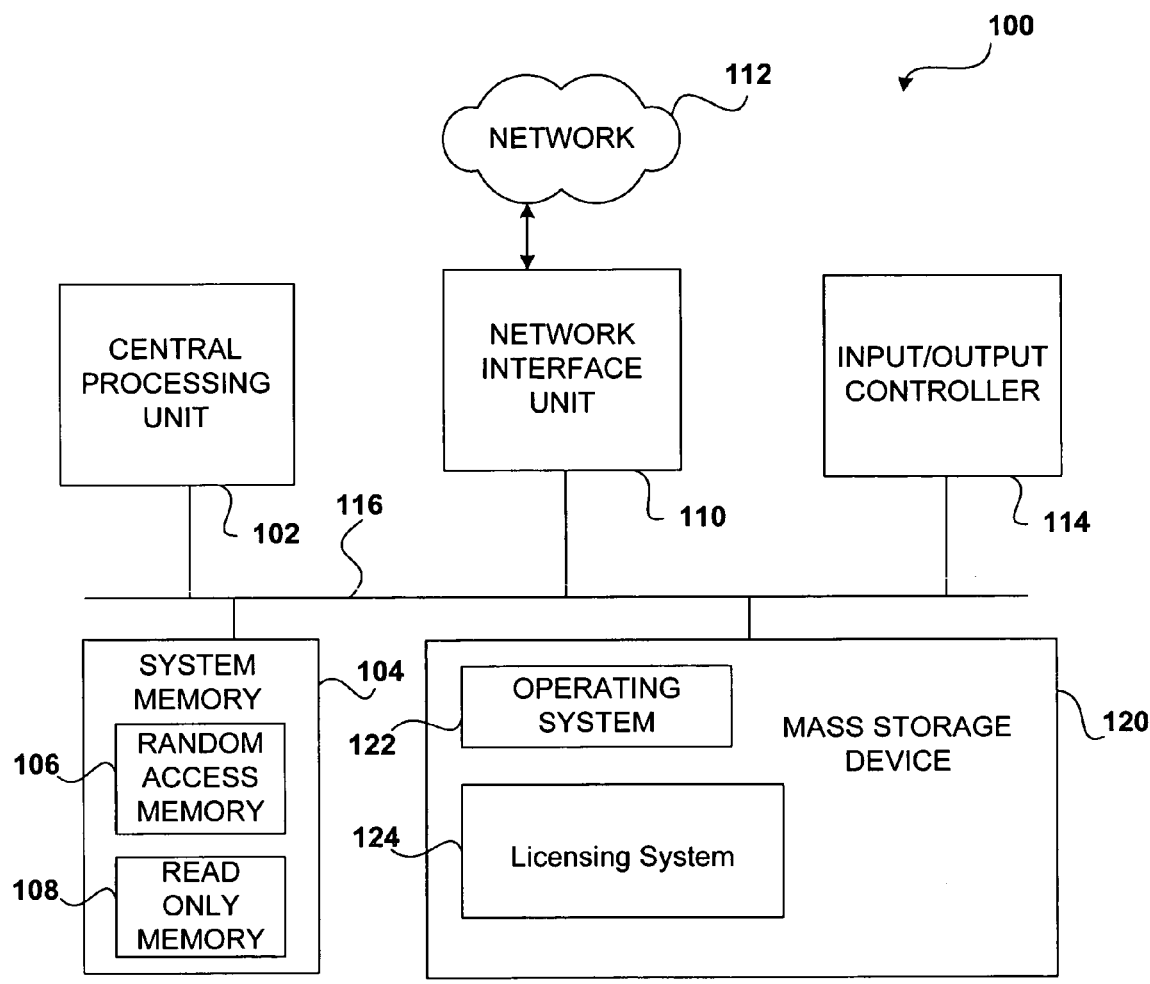
FIG. 1 illustrates an exemplary computing architecture for a computer.

Embodiments are herein described more fully below with reference to the accompanying drawings, which form a part hereof, and which show specific examples for practicing the embodiments. However, embodiments may be implemented in many different forms and should not be construed as limited to the embodiments set forth herein; rather, these embodiments are provided so that this disclosure will be thorough and complete, and will fully convey the scope of the subject matter to those skilled in the art. Embodiments disclosed may be practiced as methods, systems or devices. Accordingly, embodiments disclosed may take the form of an entirely hardware implementation, an entirely software implementation or an implementation combining software and hardware aspects. The following detailed description is, therefore, not to be taken in a limiting sense.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an exemplary computer architecture for a computing device 100 utilized in various embodiments will be described. The computer architecture shown in FIG. 1 may be configured in many different ways. For example, the computer may be configured as a personal computer, a mobile computer and the like. As shown, computing device 100 includes a central processing unit 102 ("CPU"), a system memory 104, including a random access memory 106 ("RAM") and a read-only memory ("ROM") 108, and a system bus 116 that couples the memory to the CPU 102. A basic input/output system containing the basic routines that help to transfer information between elements within the computer, such as during startup, is stored in the ROM 108. The computing device 100 further includes a mass storage device 120 for storing an operating system 122, application programs, and other program modules, which will be described in greater detail below.

The mass storage device 120 is connected to the CPU 102 through a mass storage controller (not shown) connected to the bus 116. The mass storage device 120 and its associated computer-readable media provide non-volatile storage for the computing device 100. Although the description of computer-readable media contained herein refers to a mass storage device, such as a hard disk or CD-ROM drive, the computer-readable media can be any available media that can be accessed by the computing device 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing device 100.

According to various embodiments, the computer 100 operates in a networked environment using logical connections to remote computers through a network 112, such as the Internet. The computer 100 may connect to the network 112 through a network interface unit 110 connected to the bus 116. The network interface unit 110 may also be utilized to connect to other types of networks and remote computer systems.

The computing device 100 may also include an input/output controller 114 for receiving and processing input from a number of devices, such as: a keyboard, mouse, electronic stylus and the like. Similarly, the input/output controller 114 may provide output to a display screen, a printer, or some other type of device (not shown).

As mentioned briefly above, a number of program modules and data files may be stored in the mass storage device 120 and RAM 106 of the computing device 100, including an operating system 122 suitable for controlling the operation of a networked computer, such as: the WINDOWS XP® operating system from MICROSOFT® CORPORATION; UNIX®; LINUX® and the like. The mass storage device 120 and RAM 106 may also store one or more program modules. In particular, the mass storage device 120 and the RAM 106 may store a licensing system 124.

As described herein, licensing system 124 provides a licensing structure for providing applications in a software suite in a combination of licensing types, such as trial or perpetual versions, and allowing the applications to be converted from one type to another.

Throughout the specification and claims, the following terms take the meanings explicitly associated herein, unless the context clearly dictates otherwise.

"Channel ID" is generally defined as a number that identifies the distribution channel through which a software product is delivered. For example, the software product may be delivered through an enterprise channel, where the software product is marketed to companies and other organizations. The software product may also be distributed through an OEM channel, where the software product is pre-installed on computing devices that are then sold to customers. The software product may also be distributed through a retail channel, where the software product is delivered to stores. Other channels may also be associated with a selected channel ID.

"Channel range" generally refers to distribution of channel IDs. For example, instead of being associated with one channel ID, a distribution of channel IDs may be used for software products delivered through a particular channel. For example, the retail channel may be associated with channel IDs 640-699, so that any software product that has a channel ID within that range is a software product delivered through the retail channel of distribution.

"Feature" generally refers a specific part of a software product that may be enabled or disabled. In one embodiment, different features for the same software product result in different SKUs applicable to each version of the software product. This definition for feature is separate and distinct from the definition of feature used with most installer programs. It is this definition, rather than the definition used in association with installer programs, that is the definition applicable throughout the specification and the claims for the term "feature".

"DPC file" or "licensing file" is generally defined as a file that contains stored licensing information for a particular software product. For example, the DPC file may include information that identifies which features are enabled or disabled for a particular software product. In one embodiment, each DPC file is associated with a particular SKU (Stock Keeping Unit) that identifies the software product.

"Privilege" or "privilege level" generally refers to whether a specific feature is enabled or disabled for a specific version of the software product. For example, a word processor application has "printing privilege" because a printing feature is enabled for the word processor application.

"Product key" is generally defined as the activation code that is entered to activate a particular version of a software product. As described herein, depending on the product key used, certain features of the software product are enabled or disabled. This allows the same build of the software product to be sold, but presents the software product differently to a consumer based on the product key.

"SKU" or "Stock Keeping Unit" generally refers to a unique identifier for a version of a purchasable product. For example, a full, retail, packaged, English version of a software suite may have its own associated SKU. In one embodiment, the SKU is a result of combining the product, the language, and the channel range in order to uniquely identify that product version (e.g., "OEM professional English", "retail, French, standalone", "bypass, Japanese, word processor", etc.).

"Software product" generally refers to the software application or suite of software applications that are sold as a purchasable package whether on a physical storage medium or through a purchased network download. For example, a word processor application may be sold by itself and be a single software product. Additionally, the same word processor application may be sold in combination with a spreadsheet application, and be another software product. In still another embodiment, an update to an existing software product may be its own software product. In accordance with an additional embodiment, a software product is any purchasable product that is associated with a particular SKU.

"Use experience" generally refers to the experience that a user has when interacting with a particular application. The use experience of the application is said to have changed when any user interface element, action, or other element of the application has changed.

Figure 2:
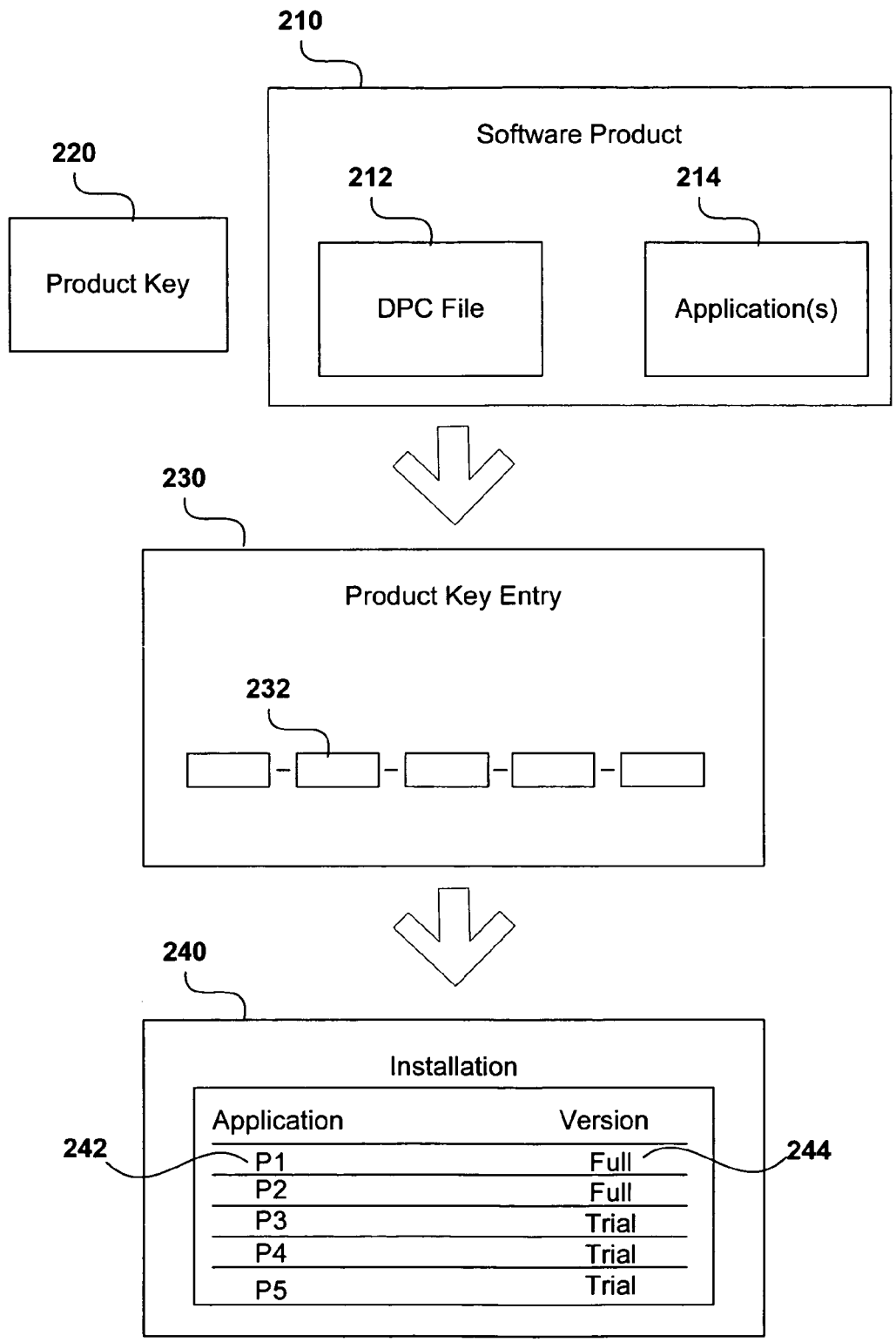
FIG. 2 illustrates a functional block diagram of an exemplary system for product key entry.

FIG. 2 illustrates a functional block diagram of an exemplary system 200 for product key entry, in accordance with the present disclosure. System 200 includes software product 210 and an associated product key 220. Software product 210 includes a DPC file 212 and one or more applications 214 that are included in the software product. Software product 210 may include applications that are part of suite that may be installed as a combination or individually. DPC file 212 is described in greater detail in the discussion of FIG. 3 below.

When software product 210 is loaded onto a computing device (e.g., computing device 100 of FIG. 1), product key entry window 230 is launched. Product key entry window 230 provides a dialog and instructions for entering product key 220. In one embodiment, product key 220 is provided as a label on packaging included with software product 210. In another embodiment, product key 220 is printed on the media containing software product 210. In still other embodiments, product key 220 is provided as part of a download, or electronically to a user for entry. In one embodiment, product key entry window 230 includes entry modules, similar to entry modules 232, for entering product key 220.

When product key 220 is entered correctly, some embodiments described herein provide installation window 240 that lists the state (e.g., 244) of the applications installed. In accordance with the subject matter described herein, the state of the application is dependent upon the product key 220 entered. For example, application P1 (e.g., 242) is the full or perpetual version of application P1, while application P5 is the trial version. These differing states of the applications are dependent on product key 220. If another product key were entered, it may be that both applications P1 and P5 are trial versions, both applications P1 and P5 are perpetual versions, application P5 is a perpetual version and application P1 is a trial version, or the state of the applications correspond to other versions entirely (e.g., enterprise/bypass). The actual code provided for the applications is allowed to remain the same, while the product key differs to provide the different products for sale (e.g., product with different SKUs). Having the actual code on the CD remain the same allows certain customers, such as computing device manufactures, to load a single version of the software on thousands of machines without having to know in advance the version of the software requested by a particular user. The user may simply be provided with a particular product key in order to obtain a particular use experience for the software product.

Figure 3:
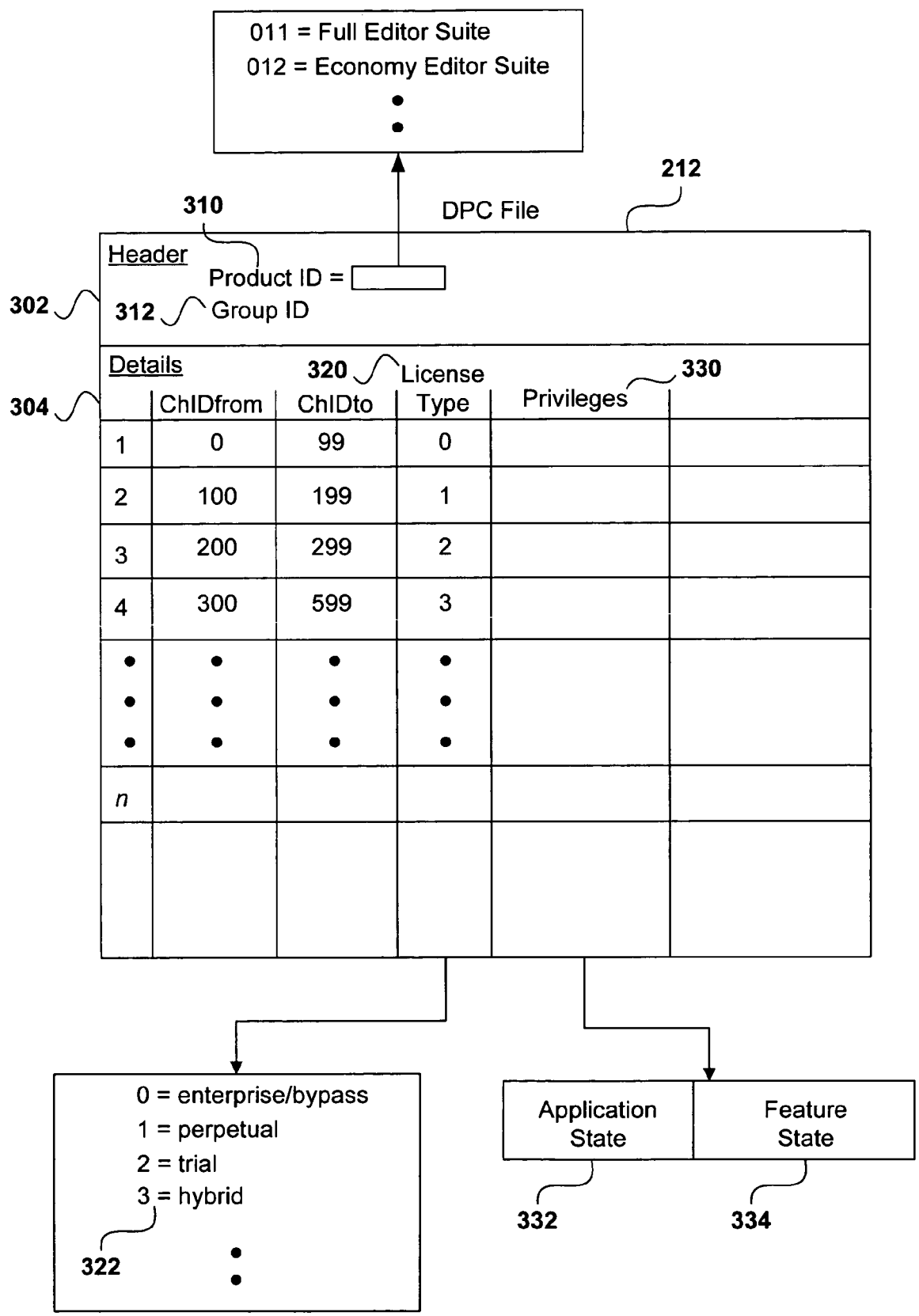
FIG. 3 illustrates an exemplary DPC file.

FIG. 3 illustrates an exemplary DPC file in accordance with the present invention. DPC file 212 corresponds to the DPC file associated with software product 210 illustrated in FIG. 2. In the embodiment shown, DPC file 212 includes header section 302 and details section 304.

In the example shown, header section 302 includes data about the associated software product (e.g., software product 210 of FIG. 2). Header section 302 includes product ID 310 and group ID 312. In one embodiment, product ID 310 corresponds to a three digit number that identifies the software product associated with the DPC file. For example, the product ID may be "011" and correspond to a full editor suite of the software.

Figure 4:
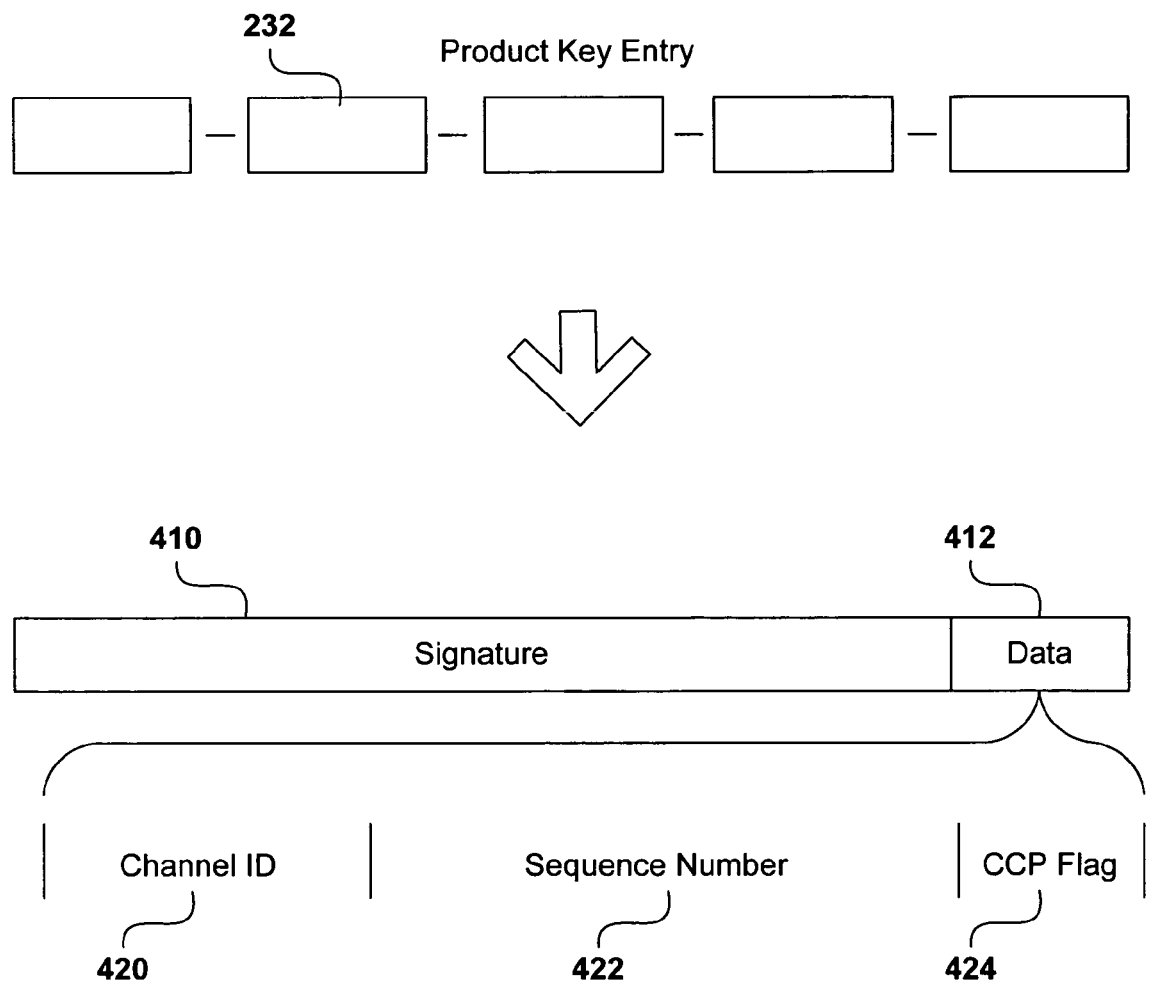
FIG. 4 illustrates an example parsing of the product key.

Group ID 312 is generated from an analysis of the product key included with the software product. Turning briefly to FIG. 4, illustrated is an example parsing of the product key, in accordance with the present disclosure. In the example shown product key 220 is entered in according to product key entry module 232. The product key may be any key that allows for secure installation of the software product. Product key entry module 232 shown is separated into five sections (for ease of entry) of five characters each to form a twenty-five character product key. This product key may then be translated to a set of bits that includes signature 410 and data 412. In one embodiment, the product key is converted from the alphanumeric characters into binary. The twenty-five characters translate into 114 bits that then comprise signature 410 (83 bits) and data 412 (31 bits). However, the specific structure of the product key or its translation is not essential for the practice of the embodiments described herein.

In one embodiment, signature 410 is generated using public/private key cryptography, with signature 410 being generated from a private key. Part of signature 410 is a hash of data 412 using a private key of a private key/public key pair. In this embodiment, when a software product is distributed, it is distributed with one of a range of public keys (e.g., public keys 116-117 correspond to word processor version 5). If the hash of data 412 is verified as being authentic according to one of these public keys, the product key entered is valid. When the comparison is made, one of the pieces of information retrieved is the private key ID (e.g., product X is valid with private key 116). Dividing the private key ID by a factor of 2 (e.g., %2 of the private key ID) results in group ID 312. The remainder of the division (e.g., division of 117 by 2 results in a remainder of 1), is the OEM flag. The OEM flag is used to denote whether a software product is a retail/enterprise or OEM version. By parsing out the product key, a group ID (e.g., 312) is determined for the DPC file (e.g., 212).

Additional information that may be derived from product key 220. Data 412 includes bits that identify a channel ID. In the example where a twenty-five character product key is used, the channel ID corresponds to 10 bits of the translated data. The 10 bits give roughly one thousand possible channel IDs. The channel ID delineates the distribution channel that the software product ships through and it is used to enable the different features of the product. For example, channel IDs in the range of 0-99 may correspond to enterprise bypass products, while channel IDs in the range of 100-199 correspond to perpetual versions of the software product, and channel IDs in the range of 200-99 represent trial versions of products. The bypass designation means that the software product need not be activated once it is installed, and perpetual refers to the software product needing to be activated only once. In contrast, trial versions of the product expire if they are not upgraded.

Data 412 produced by the product key 232, also includes sequence number 422. In one embodiment, sequence number 422 is twenty bits in length providing roughly one million possible combinations for sequence number 422. With a sequence number of this size, roughly one million product keys may be associated with each channel ID. Any size of sequence number may be used however, and implementations of the embodiments described herein are not limited to sequence numbers of a particular length.

Data 412 also includes CCP flag 424. In one embodiment, CCP flag 424 is a single bit that is toggled to indicate whether the software product corresponds to an upgrade version or a release version of the software product.

Turning back to FIG. 3, each record (e.g., 1-n) in the details section 304 includes the information for interpreting the channel ID depending on the range in which it falls. Each range of channel ID 420 corresponds to a particular license type 320. For example, channel IDs in the range of 0-99 may correspond to a license type of "0" which represents enterprise/bypass versions of the software product, while channel IDs in the range of 100-199 correspond to a license type of "1" which represents perpetual versions of the software product, and channel IDs in the range of 200-299 correspond to a license type of "2" which represents trial versions of the software product. Additionally, in accordance with the subject matter described herein, another license type ("3") is also provided that corresponds to a hybrid license type (e.g., 322). When a software product has a channel ID that corresponds to hybrid license type 322, the privileges column 330 is checked to determine the application state 332 for each application included in the software product. With the hybrid license type 322, some applications within the same software suite may be trial versions while others are perpetual or enterprise/bypass. When a software product is associated with a hybrid license type 322, the licensing system is directed to application state 332 to determine the state for each application within the software suite. An exemplary structure of application state 332 is described in the discussion of FIG. 5 below.

Figure 5:
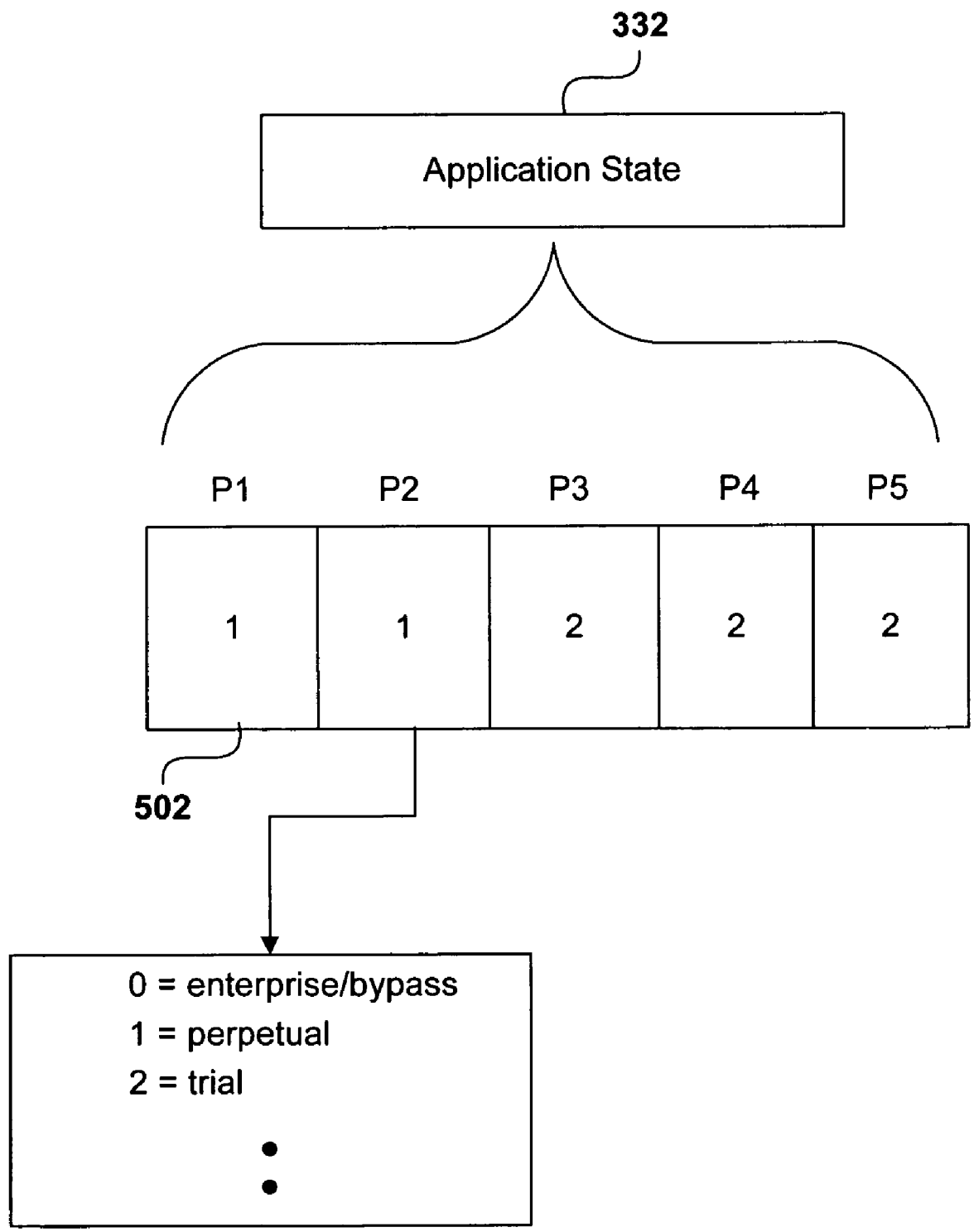
FIG. 5 illustrates the structure of the stored application state for a software product.

FIG. 5 illustrates the structure of the stored application state for a software product, in accordance with the present disclosure. Application state 332 includes one or more entries (e.g., 502) that each provide a value of the application state for a particular application of a software product. For example, as shown, application PI has an application state of "1", while application P5 has an application state of "2". The value of the application state refers to the type of license that is associated with the individual application, similar to the licensing types indicated for the software product itself. For example, the application state of "1" indicates that the application is a perpetual version, while an application state of "2" indicates that the application is a trial version. The values used to indicate the various application states are arbitrarily selected, and other values may be used to indicate the application states for other embodiments.

From the application states, the state of each application is discovered. Since the application states are dependent from the channel ID of the software product, the application states are determinable from the product key. Accordingly, supplying a different product key for particular software product can result in different combinations of applications states for the applications of the software product. One sold software product may have three applications of five as trial versions, and another sold software product may correspond to the same software suite, but have only one application as a trial version. These products have different SKUs and different product keys, but are the same software product on CD. The efficiency of having the same software product on CD with different licensing levels extends to allowing a user to upgrade the software product at any time without the need to download additional code. Instead, the user is required to simply purchase another product key and enter to have the perpetual versions of their trial products activated. An exemplary process for upgrading or upselling a particular software product to obtain another version of the software product in accordance with the present disclosure is described below.

Figure 6:
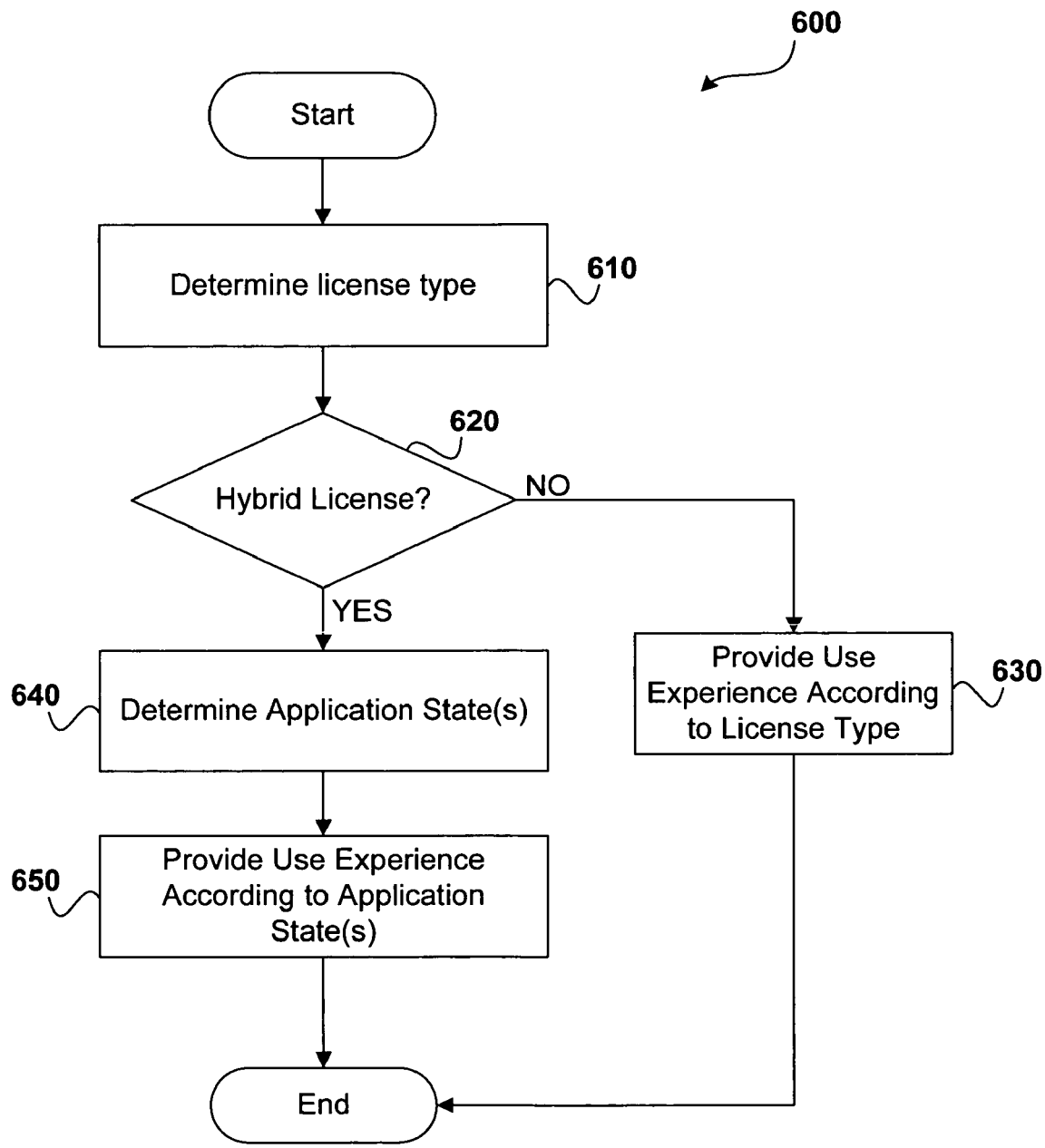
FIG. 6 illustrates an operational flow diagram of an exemplary process for providing a particular use experience for an application.

FIG. 6 illustrates an operational flow diagram of an exemplary process for providing a particular use experience for an application of a software product, in accordance with the present disclosure. Process 600 begins when a user has installed a software product. For this example, the software product includes more than one application in the software product. Processing continues with operation 610.

At operation 610, the license type for the software are product is determined from the product key. The product key is parsed to determine the channel ID for the software product. With the channel ID, the license type may be determined from the data included in the DPC file. Once the license type is determined, processing continues with decision operation 620.

At decision operation 620, a determination is made whether the license type determined for the software product is a hybrid license type. If the license type is not a hybrid license type (e.g., the license type indicates that the entire product is a trial product, perpetual product, enterprise/bypass product, or the like), then processing moves to operation 630.

At operation 630, a use experience for the software product is provided according to the license type. Since the license type indicates a homogeneous use experience for the entire software product, the use experience for that license type is provided for the software product. For example, if the license type indicated that the software product was a trial product, a use experience consistent with trial versions of software would be used. The user may be provided with notifications of expirations of the product (see FIG. 7), the user may be provided with dialogs directed at allowing the user to upgrade their software product (see FIG. 8), certain features of the product may not be available, and other changes in the experience with the product for the user may be used. Once a use experience is commenced for the software product according to the license type, process 600 ends, and processing moves to other tasks.

However, returning to operation 620, if the license type indicates that the software product is associated with a hybrid license, processing continues at operation 640. At operation 640, the application state(s) for any applications included in the software product are determined individually. As previously described, the DPC file stores the application states for the applications based on the product key provided. With one product key, the applications may mostly correspond to trial applications as given by their application states, with only a few applications included in the software suite in their full versions. With another product key, the applications may mostly correspond to perpetual versions, with only a few applications included in the software suite as trial versions. The available combinations of application state(s) for the applications included in a software suite are not limited to these examples however, and any combination may be provided. Once the application state(s) are determined for each of the application(s) of the software product, processing continues with operation 650.

At operation 650, a use experience for the software product is provided according to the application state(s) determined for the application(s) of the software product. Since the license type indicated a hybrid license type, a heterogeneous use experience is provided for the software product, with the use experience for each application based on its application state. For example, if the application state indicated that a first application was a trial version, while a second application was a perpetual version, a use experience consistent with trial versions of software would be used for the first application while a use experience consistent with perpetual versions of software would be used for the second application. For the trial version, the user may be provided with notifications of expirations of the trial application (see FIG. 7), dialogs directed at allowing the user to upgrade their trial application (see FIG. 8), indications certain features of the trial application may not be available, and other changes in the experience for the application. In contrast, for the perpetual application, the user may instead be provided with activation dialogs, update dialogs, additional features unavailable with trial versions, and other advantages that come with the perpetual version of the software product. Once a use experience is commenced for the software product according to the application state(s) of the application(s), process 600 ends, and processing moves to other tasks.

Figure 7:
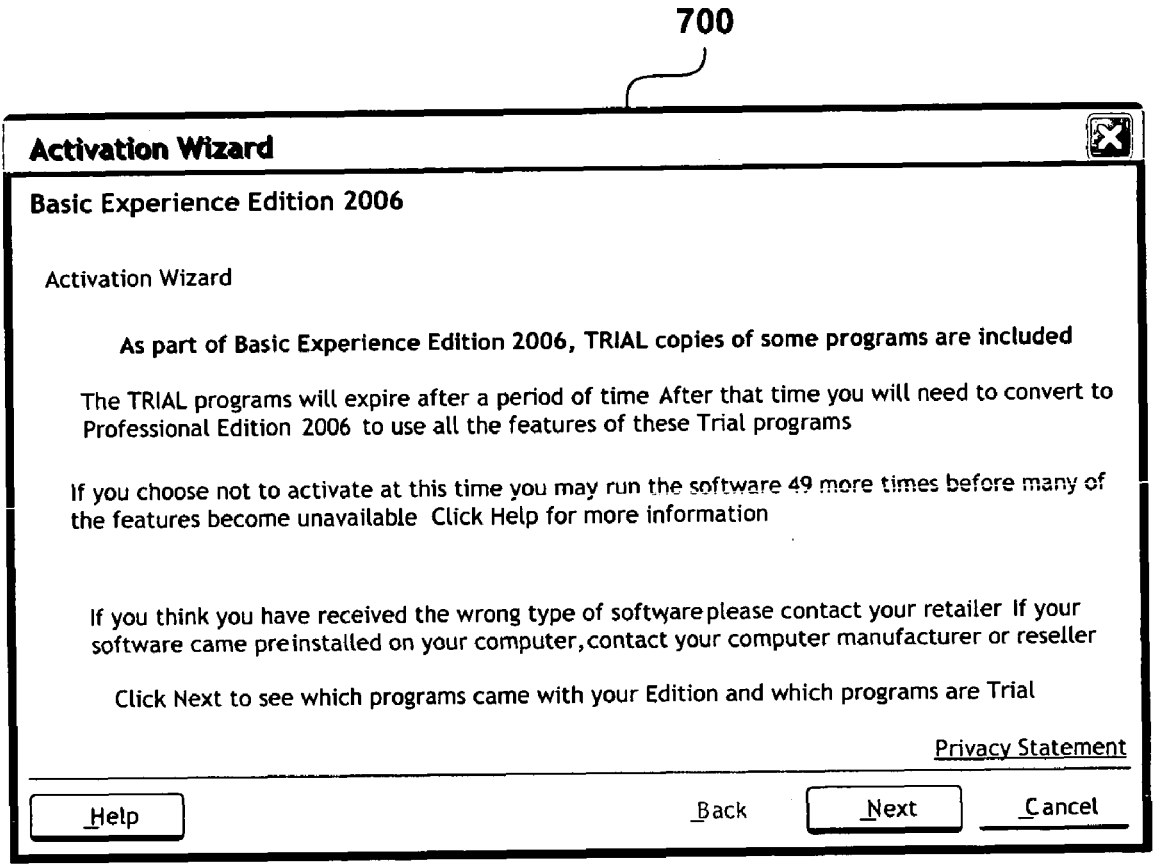
FIG. 7 illustrates an exemplary dialog prompting a user for an upgrade of a software product.

FIG. 7 illustrates an exemplary dialog prompting a user for an upgrade of a software product, in accordance with the present disclosure. A dialog similar to dialog 700 is provided when the license type associated with the software product corresponds to a trial license or possibly a hybrid license. Dialog 700 corresponds to a software product with a hybrid license when one or more of the applications included in the software product are trial versions. The language included in dialog 700 shown indicates that the associated software product corresponds to hybrid license.

Dialog 700 warns the user that the trial applications included in the software product have an expiration date and gives the user an opportunity to upgrade their trial applications to full versions. This type of dialog may be provided as part of a use experience provided to the user when the user installs one or more trial applications as part of a software product. Another use experience may be provided to the user in place of a use experience that includes dialog 700 without departing from the spirit or scope of the present disclosure.

Figure 8:
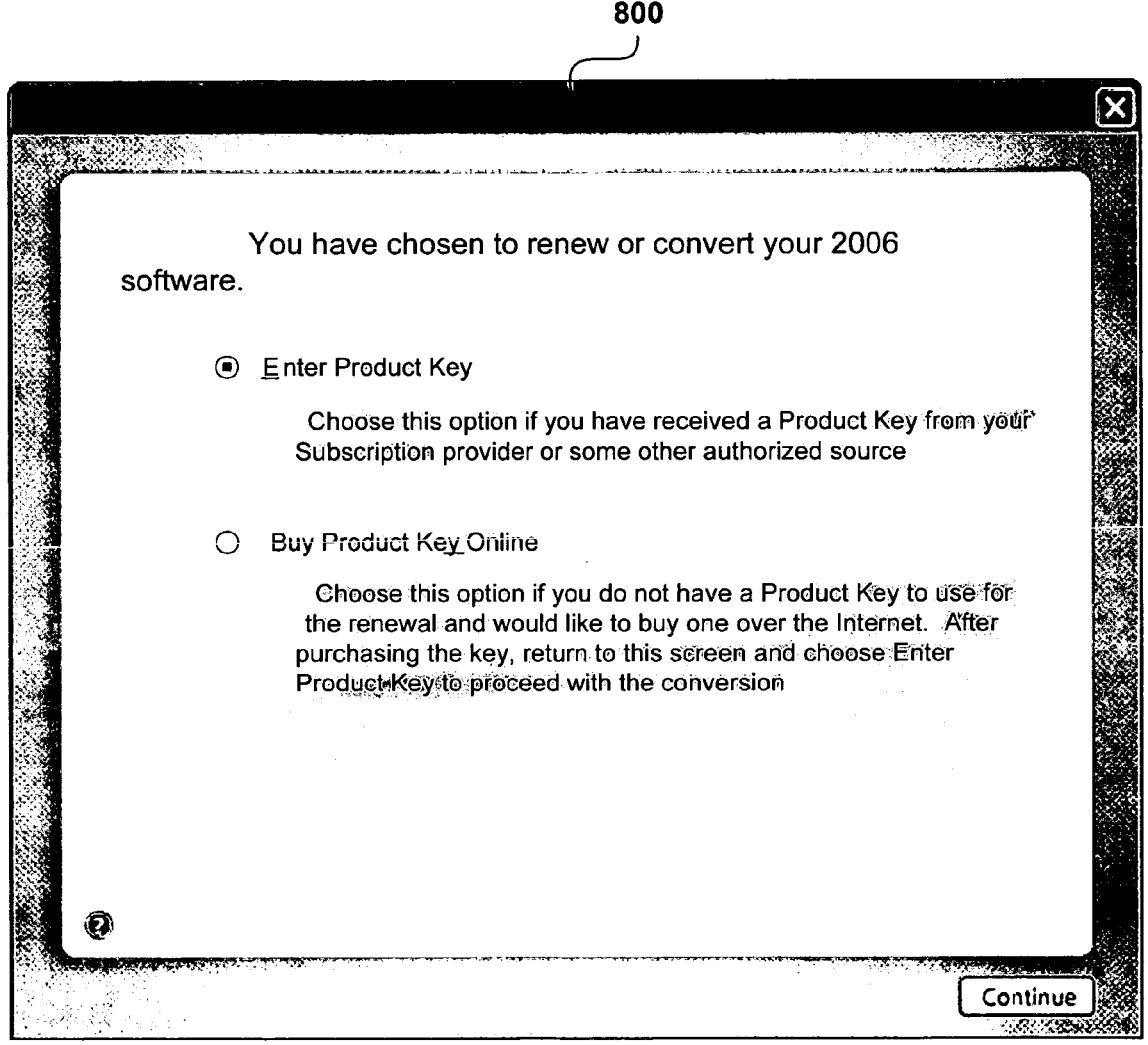
FIG. 8 illustrates an exemplary dialog provided in response to a selection by a user to upgrade a software product, in accordance with the present disclosure.

FIG. 8 illustrates an exemplary dialog provided in response to a selection by a user to upgrade a software product, in accordance with the present disclosure. As indicated by dialog 800, what the customer is purchasing for the product, is not a new version of the software, but a new product key. Instead of having to download additional software to convert from a trial version to a perpetual version of the product, a user simply purchases a new product key. The user may obtain the product key from a retail brick-and-mortar location, or as download from a network. Other methods of purchase of a new product key are also available. From the new product key the license type of the software product is determined, and a new use experience may be provided to the user.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for changing a licensing state of an installed software product, comprising:
   receiving a selection, by a computing device, for changing the licensing state of the installed software product on the computing device; wherein the installed software product comprises a first application, a second application, and a licensing file; wherein the licensing file includes a mapping of channel identifier ID ranges to corresponding licensing states for the first application and the second application; wherein each of the license states includes hybrid license indicator, application state, and feature state for the first and second application; and wherein the hybrid indicator comprises a value used to determine that a license type of the first application and a license type of the second application are different;
   prompting, by the computing device, for a product key, wherein the product key comprises a channel identifier ID and signature;
   receiving the product key by the computing device;
   parsing, by the computing device, the product key;
   obtaining, by the computing device, a channel identifier ID from the parsing of the product key;
   identifying, by the computing device, a hybrid license indicator from the licensing file based on the obtained channel identifier ID;
   based on the identifying of the hybrid license indicator, accessing, by the computing device, application state and feature state of the first application and the second application from the license file using the obtained channel identifier ID; wherein the application state includes license type of the first and second application; and
   activating, by a computer processor of the computing device, the installed first application and the installed second application of the software product based on the application state and the feature state accessed from the license file.

2. The computer-implemented method of claim 1, wherein the license type of the first application is a restricted license type and the license type of the second application is an unrestricted license type, wherein activating the first application and the second application includes providing access to less than all of the first number features of the first application and providing access to all of the second number of features of the second application.

3. The computer-implemented method of claim 2, wherein the restricted license type is a trial license type.

4. The computer-implemented method of claim 1, wherein the license type of the first application is a trial license type having an expiration.

5. The computer-implemented method of claim 4, further comprising generating a notification to indicate the trial version is expiring for the first application, and presenting the generated expiration notification on the computing device.

6. The computer-implemented method of claim 4, further comprising providing a prompt for entering a new product key upon expiration of the trial license type.

7. The computer-implemented method of claim 6, further comprising receiving acceptance of the new product key in the prompt; and permitting access to a larger number of features of the first application that is associated with the trial license type.

8. A computer-readable storage medium having computer executable instructions which when executed a processor cause the processor to perform steps for changing a licensing state of an installed software product, the steps comprising:

receiving a selection for changing the licensing state of the installed software product on a computing device; wherein the installed software product comprises a first application, a second application, and a licensing file; wherein the licensing file includes a mapping of channel identifier ID ranges to corresponding licensing states for the first application and the second application; wherein each of the license states includes hybrid license indicator, application state, and feature state for the first and second application; and wherein the hybrid indicator comprises a value used to determine that a license type of the first application and a license type of the second application are different;

prompting for a product key, wherein the product key comprises a channel identifier ID and signature;

receiving the product key;

parsing the product key;

obtaining a channel identifier ID from the parsing of the product key;

identifying a hybrid license indicator from the licensing file based on the obtained channel identifier ID;

based on the identifying of the hybrid license indicator, accessing application state and feature state of the first application and the second application from the license file using the obtained channel identifier ID; wherein the application state includes license type of the first and second application; and activating the installed first application and the installed second application of the software product based on the application state and the feature state accessed from the license file.

9. The computer-readable storage medium of claim 8, wherein the license type of the first application is a restricted license type and the license type of the second application is an unrestricted license type, wherein activating the first application and the second application includes providing access to less than all of the first number features of the first application and providing access to all of the second number of features of the second application.

10. The computer-readable storage medium of claim 9, wherein the restricted license type is a trial license type.

11. The computer-readable storage medium of claim 8, wherein the license type of the first application is a trial license type having an expiration.

12. The computer-readable storage medium of claim 11, further comprising generating a notification to indicate the trial version is expiring for the first application, and presenting the generated expiration notification on the computing device.

13. The computer-readable storage medium of claim 11, further comprising providing a prompt for entering a new product key upon expiration of the trial license type.

14. The computer-readable storage medium of claim 13, further comprising receiving acceptance of the new product key in the prompt; and permitting access to a larger number of features of the first application that is associated with the trial license type.

15. A system for changing a licensing state of an installed software product, the system comprising:

a processor; and a memory having computer-executable instructions stored thereon, the instructions when executed by the processor cause the system to perform steps comprising:

receiving a selection for changing the licensing state of the installed software product on the system; wherein the installed software product comprises a first application, a second application, and a licensing file; wherein the licensing file includes a mapping of channel identifier ID ranges to corresponding licensing states for the first application and the second application; wherein each of the license states includes hybrid license indicator, application state, and feature state for the first and second application; and wherein the hybrid indicator comprises a value used to determine that a license type of the first application and a license type of the second application are different;

prompting for a product key, wherein the product key comprises a channel identifier ID and signature;

receiving the product key by the computing device;

parsing the product key;

obtaining a channel identifier ID from the parsing of the product key;

identifying a hybrid license indicator from the licensing file based on the obtained channel identifier ID;

based on the identifying of the hybrid license indicator, accessing application state and feature state of the first application and the second application from the license file using the obtained channel identifier ID; wherein the application state includes license type of the first and second application; and activating the installed first application and the installed second application of the software product based on the application state and the feature state accessed from the license file.

16. The system of claim 15, wherein the license type of the first application is a restricted license type and the license type of the second application is an unrestricted license type, wherein activating the first application and the second application includes providing access to less than all of the first number features of the first application and providing access to all of the second number of features of the second application.

17. The system of claim 16, wherein the restricted license type is a trial license type.

18. The system of claim 15, wherein the license type of the first application is a trial license type having an expiration.

19. The system of claim 18, further comprising generating a notification to indicate the trial version is expiring for the first application, and presenting the generated expiration notification on the computing device.

20. The system of claim 18, further comprising providing a prompt for entering a new product key upon expiration of the trial license type.

* * * * *